Patented May 4, 1937

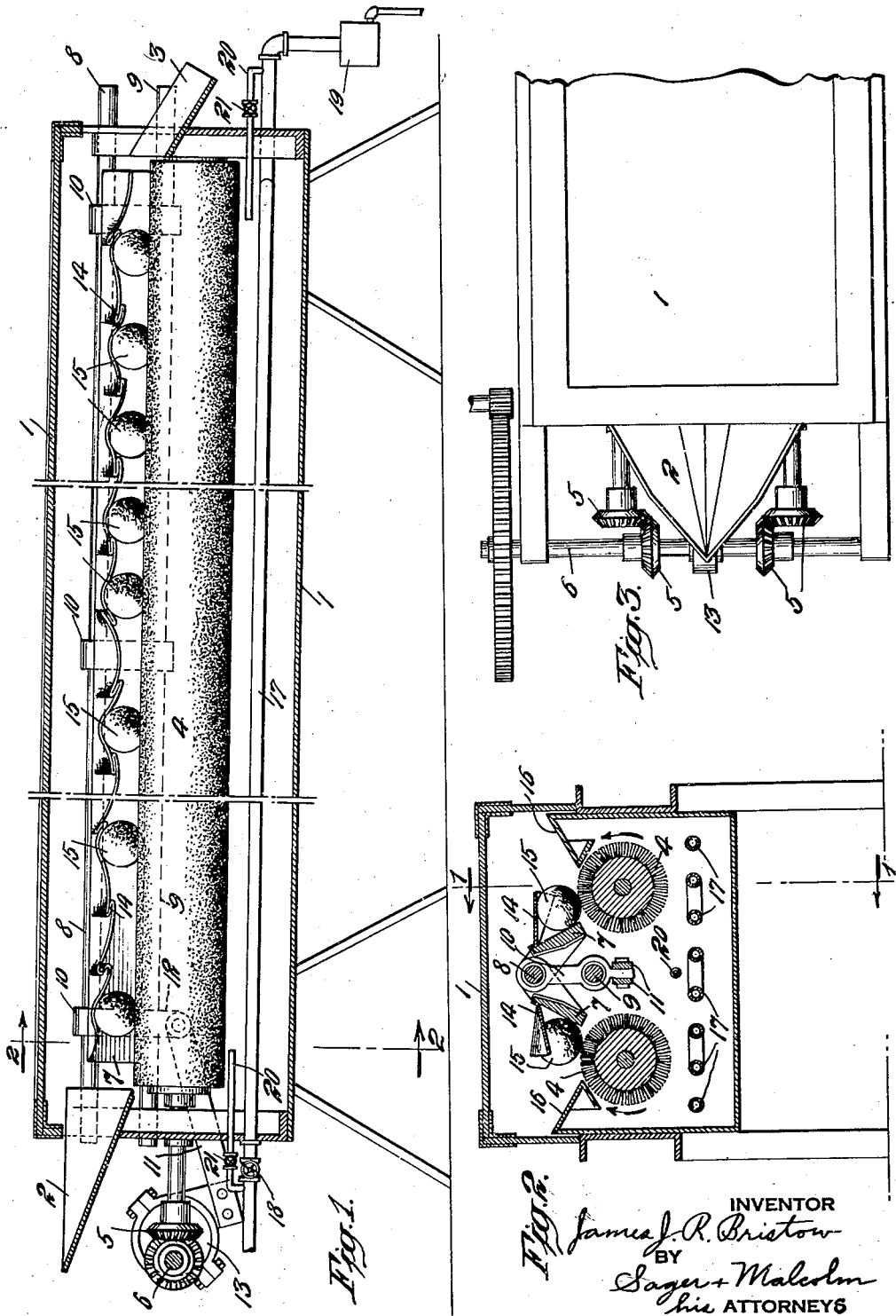

2,079,278

UNITED STATES PATENT OFFICE 2,079,278

PROCESS OF CLEANING FRUIT

James J. R. Bristow, Safety Harbor, Fla.

Application August 19, 1935, Serial No. 36,810

4 Claims. (Cl. 146—219)

This invention relates to a process of cleaning the accumulated dirt and adhering matter from the exterior of fruits and vegetables, without the use of a solvent, such as water, oil, soap, solutions, or other liquid solvent. The invention is particularly directed to the cleaning of fruits and vegetables which have a natural secretion of a waxy nature on the surface, such as oranges, grapefruit, and, in general, the citrus family, though this invention is not limited to them exclusively.

For a great many years it has been known that the citrus fruits could be cleaned by soaking in a tank of water, generally containing soap, to loosen the dirt; passing over a revolving or moving brush, on which a spray of water was playing, to scrub off the adhering dirt; and then sending through a machine in which a current of warm air dried off the excess water.

Practically all fruits and vegetables require cleaning before sending to market, but in the use of water, or soap and water, there is a definite deterioration. To avoid this deterioration, numerous methods have been devised, employing solvents, such as gasoline, kerosene, benzol, oils, etc. That none of these solvents are in use at the present time, is sufficient evidence that they are of no value. It is the current opinion that solvents are the cause of more damage to fruits than water, alone.

One of the objects of this invention is to disclose and provide a method whereby fruit can be cleaned without the use of either liquid, water or solvent.

It is a well known fact that certain fruits and vegetables secrete a waxy material on their surface as a natural product of growth. On citrus fruits this wax melts at a temperature of about 120° F. By taking advantage of this fact, therefore, I have discovered that it is possible to clean their surfaces without the use of water, soap or solvents.

An object of this invention is to provide an improved method of and apparatus for cleaning fruit.

Another object is to provide a method of and apparatus for cleaning certain fruits without the use of water, soap, solvents, etc.

A still further object of the invention is to provide a method of and apparatus for cleaning certain fruits without the use of water, soap, solvents, etc., and without injury to the peel of the said fruits, and their subsequent deterioration.

These and other objects, uses and advantages will become apparent to those skilled in the art, from the following description of a preferred mode of treatment and of certain variations thereof and of one form of preferred apparatus. In order to facilitate understanding, particular reference will be made to the adaption of the invention to the treatment of citrus fruits, such as oranges, grapefruit, tangerines, etc.

As has been stated hereinbefore, the exterior of growing citrus fruit is covered by a self-secreted wax, and in the process of growth, various deposits of dirt and molds form on the fruit and adhere to the waxy surface, which holds it until it is cleaned off.

Generally stated this process comprises heating the fruit, or its outside surface, to a sufficient temperature to melt the wax of the orange and thereby loosen the adhering dirt and then cleaning the fruit. This temperature may be between 130° F. and 200° F., but the lower temperature is preferred as less liable to injure the fruit. The dirt from the fruit is removed conveniently by brushes, and is to some extent retained by them. To prevent the brushes from accumulating the dirt, they are subjected to a mist of live steam. The heating and cleaning are preferably accomplished in enclosed space. The live steam when admitted to this space will serve to coagulate the dirt particles, which are then thrown off the brush. The fruit is delivered after treatment dry and clean, or with so little adhering moisture that it immediately evaporates from the warm surface of the peel.

The accompanying drawing shows a preferred form of apparatus for practising the method, particularly applicable for cleaning oranges or other citrus fruit and wherein:

Fig. 1 is a longitudinal vertical section on the line 1—1 of Fig. 2;

Fig. 2 is a vertical section on the line 2—2 of Fig. 1; and

Fig. 3 is a plan view of one end of the machine showing the driving means.

The machine is generally similar to that shown in U. S. patent to B. C. Skinner, No. 1,844,264, granted February 9, 1932, although no water spray or use of water is necessary or desirable in the present invention.

The cleaning apparatus is shown enclosed in a long rectangular closed box or casing 1. This may be of metal covered with heat insulating material, or may be made of any suitable heat insulating material such as celotex, or of any suitable material, or combination of different materials. At the entrance end of the box is an opening having a chute 2 for receiving the fruit, and at the exit is an opening having a chute 3 for delivering the fruit. These openings may each be partly covered by a curtain of canvas or other suitable material to avoid waste of heat from the box.

Extending longitudinally within the box are two brushes 4 parallel to each other and driven in opposite directions by bevel gears 5 from a driving shaft 6. The brushes are preferably of fairly stiff fibre. Above the brushes and towards the center are a pair of runways 7 of wood extending longitudinally and at an angle to the brushes to guide the fruit along the brushes. These runways are reciprocated longitudinally for turning the fruit in its travel so that all parts thereof are effectively cleaned by the brushes. The runways are supported by a bar 8 above and between them and are angularly adjustable on the bar to accommodate fruit of different sizes. The bar is connected to a reciprocating rod 9 below it by intermediate supports 10. The rod 9 is suitably supported in the box and driven back and forth by an arm 11 pivotally connected to an extension 12 from the rod. The arm 11 is secured to the sleeve of an eccentric 13 mounted on and driven by the shaft 6. Canvas strips 14 are secured along the upper edges of the runways 7 and folded at spaced intervals. This canvas lies over the top of the fruit indicated at 15 and assists the turning of the fruit as its travels along the brushes. Strips 16 extend along opposite sides of the box near and over the brushes to guide the fruit. The direction of rotation of the brushes is as indicated by the arrows in Fig. 2 which tends to keep the fruit in contact with the runways and under the canvas. The box is supported so as to be inclined downwardly from the entrance end to the outlet end.

In the lower part of the box are located heating pipes, or radiator coils 17, shown extending the length of the box. An inlet valve 18 admits steam at the entrance end and a trap 19 controls the discharge of the condensate at the other end. Auxiliary pipes 20 with valves 21 control the admission of steam to the space within the box.

In operation, steam is admitted to the heating coils 17 and the temperature within the box is brought to above 130° F., preferably at about 140° F. One or both of the valves 21 are then opened to admit steam to the box and this admission is adjusted to create a faint mist in the box. The machine being started, the fruit is then introduced and the outside of the fruit is heated to the proper temperature and carried along and brushed. The inclination of the machine and speed of the parts should be adjusted to insure a proper time interval for the passage of the fruit through the machine, as long exposure to a high temperature would be injurious. A desirable time interval of treatment of oranges is about 30 seconds, although this may be varied according to the character of the fruit, the temperature, efficiency of the brushing and other factors. The fruit is delivered clean and dry, or sufficiently dry as to immediately give up any traces of condensation thereon.

The amount of moisture introduced to the atmosphere of treatment should preferably be such that the dew-point is above the temperature of the entering fruit. The humidity of this atmosphere should be high, such as 90 or 95 per cent and may be fully saturated, or of 100 per cent humidity. Atomized moisture may be introduced instead of steam into the enclosing casing.

The heating of the enclosing casing may be external or may be accomplished by heating the brushes by passing steam through their shafts, or in various other ways.

Although a preferred embodiment of the invention has been described, various modifications may be made without departing from the scope thereof.

The invention claimed is:

1. Process for dry cleaning fruits having a natural waxy surface which consists in softening the natural wax by heating the substantially dry fruit to a temperature of about 140° F. while subjecting the fruit to an atmosphere containing an amount of moisture such that the dew point is above the temperature of the entering fruit, scrubbing the surface of the fruit while so heated to remove the loosened dirt and discharging the fruit with only slight moisture of condensation thereon at a temperature such that the moisture immediately evaporates to leave a dry surface.

2. Process for dry cleaning fruits having a natural waxy surface which consists in heating the substantially dry fruit to a temperature above the melting point of the natural wax while subjecting the fruit to an atmosphere containing an amount of moisture such that the dew point is above the temperature of the entering fruit, scrubbing the surface of the fruit while so heated to remove the loosened dirt and discharging the fruit with only slight moisture of condensation thereon at a temperature such that the moisture immediately evaporates to leave a dry surface.

3. Process for dry cleaning fruits having a natural waxy surface which consists in heating the substantially dry fruit to a temperature above the melting point of the natural wax while subjecting the fruit to an atmosphere containing an amount of moisture such that the dew point is above the temperature of the entering fruit, brushing the surface of the fruit while so heated to remove the loosened dirt and discharging the fruit with only slight moisture of condensation thereon at a temperature such that the moisture immediately evaporates to leave a dry surface.

4. Process for dry cleaning fruits having a natural waxy surface which comprises heating the fruit to a temperature slightly above the melting point of the natural wax so as to soften the wax and loosen the dirt, and brushing the surface, while so heated and in substantially dry condition, to remove the loosened dirt therefrom.

JAMES J. R. BRISTOW.